(12) United States Patent
Wang

(10) Patent No.: US 11,262,869 B2
(45) Date of Patent: Mar. 1, 2022

(54) TOUCH DISPLAY CONTROL CIRCUIT, CONTROL METHOD AND ELECTRONIC DEVICE

(71) Applicant: FOCALTECH ELECTRONICS, LTD., Grand Cayman (KY)

(72) Inventor: Yunn-Hwa Wang, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 0 days.

(21) Appl. No.: 17/090,084

(22) Filed: Nov. 5, 2020

(65) Prior Publication Data

US 2021/0124474 A1 Apr. 29, 2021

Related U.S. Application Data

(63) Continuation-in-part of application No. 16/516,146, filed on Jul. 18, 2019, now abandoned.

(30) Foreign Application Priority Data

Jul. 19, 2018 (CN) .......................... 201810795216.X

(51) Int. Cl.
  *G06F 3/041* (2006.01)
  *G06F 3/044* (2006.01)
(52) U.S. Cl.
  CPC .......... *G06F 3/04166* (2019.05); *G06F 3/044* (2013.01); *G06F 3/0412* (2013.01)

(58) Field of Classification Search
  CPC .... G06F 3/04166; G06F 3/044; G06F 3/0412; G06F 3/0445; G06F 3/0446;
  (Continued)

(56) References Cited

U.S. PATENT DOCUMENTS

2012/0098776 A1 4/2012 Chen et al.
2016/0266694 A1 9/2016 Lee et al.
(Continued)

FOREIGN PATENT DOCUMENTS

CN 101943961 A 1/2011
CN 105573548 A 5/2016
(Continued)

*Primary Examiner* — Rodney Amadiz
(74) *Attorney, Agent, or Firm* — Muncy, Geissler, Olds & Lowe, P.C.

(57) ABSTRACT

A touch display control circuit, a control method, and an electronic device are provided. The touch display control circuit is configured to drive STN-LCD screens, TN-LCD screens and CSTN-LCD screens. The touch display control circuit includes a display driving circuit and a touch detection circuit. The display driving circuit includes a signal transmission line, multiple groups of signal selection circuits and a reference voltage generation circuit. The signal transmission line is configured to transmit a gate signal and a common signal. The signal selection circuit is configured to select a preset control voltage based on display control timing or touch control timing. The reference voltage generation circuit is configured to provide the preset control voltage. The touch detection circuit is connected to the signal selection circuit and is configured to perform touch detection based on the touch control timing.

21 Claims, 8 Drawing Sheets

(58) Field of Classification Search
CPC .......................... G06F 3/0416; G09G 2354/00; G09G 3/3681; G09G 3/3692; G09G 2310/0291; G09G 3/36
See application file for complete search history.

(56) References Cited

U.S. PATENT DOCUMENTS

| | | |
|---|---|---|
| 2017/0090624 A1 | 3/2017 | Kwon et al. |
| 2017/0108976 A1* | 4/2017 | Ding .................. G06F 3/044 |
| 2017/0168620 A1 | 6/2017 | Gim |
| 2017/0192614 A1 | 7/2017 | Lee et al. |
| 2017/0262121 A1 | 9/2017 | Kurasawa et al. |
| 2018/0217706 A1* | 8/2018 | Huang .................. H05K 1/189 |
| 2018/0329570 A1 | 11/2018 | Chan et al. |

FOREIGN PATENT DOCUMENTS

| | | |
|---|---|---|
| CN | 107037914 A | 8/2017 |
| CN | 107885364 A | 4/2018 |

\* cited by examiner

TOUCH DISPLAY CONTROL CIRCUIT, CONTROL METHOD AND ELECTRONIC DEVICE

CROSS REFERENCE OF RELATED APPLICATION

The present application is a continuation-in-part of co-pending application Ser. No. 16/516,146 filed on Jul. 18, 2019, for which priority is claimed under 35 U.S.C. § 120; and the present application claims priority to Chinese Patent Application No. 201810795216.X, titled "TOUCH DISPLAY CONTROL CIRCUIT, CONTROL METHOD AND ELECTRONIC DEVICE", filed on Jul. 19, 2018 with the Chinese Patent Office, which is incorporated herein by reference in its entirety.

FIELD

The present disclosure relates to the technical field of semiconductors, and in particular to a touch display control circuit, a control method and an electronic device.

BACKGROUND

With the development of the technology, an electronic device including a liquid-crystal display (LCD) screen with a touch function is increasingly popular. Nowadays, capacitive touch technology is widely used in thin-film-transistor liquid crystal display (TFT-LCD) screen.

Luminance and dynamic response speeds of a super twisted nematic liquid crystal display (STN-LCD) screen, a twisted nematic liquid crystal display (TN-LCD) screen and a color super twisted nematic liquid crystal display (CSTN-LCD) screen are lower than that of the TFT-LCD screen. However, the STN-LCD screen and the like is still widely used in electronic devices due to a low cost. If a touch screen is attached with such liquid crystal display screen with the low cost, the integrated liquid-crystal display screen has poor display effect and a high cost. Therefore, the STN-LCD screen and the like are only used to display and cannot achieve the touch function.

Based on the above, a technical problem to be solved by those skilled in the art is to provide a touch display circuit, such that the STN-LCD screen, the TN-LCD screen and the CSTN-LCD screen can achieve the touch function without changing their original configurations.

SUMMARY

In view of this, a touch display control circuit, a control method, and an electronic device are provided in the present disclosure, such that the STN-LCD screen, the TN-LCD screen and the CSTN-LCD screen can achieve the touch function without changing their original configurations.

Based on the above, the following technical solutions are provided in the present disclosure.

A touch display control circuit for driving a liquid crystal display screen is provided. The touch display control circuit includes a display driving circuit and a touch detection circuit. The display driving circuit includes a signal transmission line, a signal selection circuit and a reference voltage generation circuit. The signal transmission line is configured to transmit a gate signal and a common signal. The signal selection circuit is configured to select a preset control voltage based on display control timing or touch control timing. The reference voltage generation circuit is connected to the signal selection circuit and is configured to provide the preset control voltage. The touch detection circuit is connected to the signal selection circuit and is configured to perform touch detection based on the touch control timing.

In an embodiment, the signal selection circuit includes a gate signal selection sub-circuit and a common electrode signal selection sub-circuit. The gate signal selection sub-circuit is connected to the reference voltage generation circuit, and is configured to select a target gate voltage based on the display control timing and transmit the target gate voltage to a gate line in the signal transmission line. The common electrode signal selection sub-circuit is connected to the reference voltage generation circuit, and is configured to select a target common voltage based on the display control timing or the touch control timing, and transmit the target common voltage to a common line in the signal transmission line.

In an embodiment, the number of the touch detection circuit is equal to or greater than two. Each common line is connected to one common electrode signal selection sub-circuit. Each common electrode signal selection sub-circuit is connected to any one of the touch detection circuits.

In an embodiment, each common line is connected to one common electrode signal selection sub-circuit. Multiple common electrode signal selection sub-circuits are connected to a same touch detection circuit.

In an embodiment, the signal selection circuit includes multiple switches. A control terminal of each of the multiple switches is controlled based on the display control timing or touch control timing, to select the preset control voltage and transmit the selected preset control voltage to the signal transmission line.

In an embodiment, the number of the touch detection circuit is equal to or greater than two. Each common line is connected to one signal selection circuit. Each signal selection circuit is connected to any one of the touch detection circuit.

In an embodiment, each common line is connected to one signal selection circuit. Multiple signal selection circuits are connected to a same touch detection circuit.

In an embodiment, the touch detection circuit includes an amplifier and multiple switches. The amplifier is configured to detect a change value of self-capacitance of a common electrode and output a voltage signal corresponding to the change value of the self-capacitance.

A control method applied to the touch display control circuit is provided. The control method includes: controlling, based on the display control timing, the display driving circuit to be in an on-state and the touch detection circuit to be in an off-state, and selecting the preset control voltage, to allow the display driving circuit to output the preset control voltage to the signal transmission line, during a period of display timing; and controlling, based on the touch control timing, the touch detection circuit to perform touch detection, during a period of display touch timing.

In an embodiment, the period of display touch timing includes a first sub-period and a second sub-period. During the first sub-period, the display driving circuit is in the on-state, and the touch detection circuit is in the off-state and a self-correction state. During the second sub-period, the touch detection circuit performs the touch detection.

In an embodiment, the method includes performing the display control timing and the touch control timing based on a predetermined rule. The predetermined rule includes that: m display control timing and n display touch control timing are performed alternately, where m is an integer greater than or equal to zero, and n is an integer greater than or equal to one.

An electronic device is provided, which includes a body and the above-described touch display control circuit.

Compared with the conventional technology, the technical solutions in the present disclosure have the following advantages. A touch display control circuit is provided in the present disclosure. The touch display control circuit is configured to drive the STN-LCD screen, the TN-LCD screen and the CSTN-LCD screen. The touch display control circuit includes a display driving circuit and a touch detection circuit. The display driving circuit includes a signal transmission line, multiple groups of signal selection circuits, and a reference voltage generation circuit. The signal transmission line is configured to transmit a gate signal and a common signal. The signal selection circuit is configured to select a preset control voltage based on display control timing or touch control timing. The reference voltage generation circuit is configured to provide the preset control voltage. The touch detection circuit is connected to the signal selection circuit and is configured to perform touch detection based on the display touch control timing. It is to be seen that with the touch display control circuit provided in the present disclosure, the STN-LCD screen, the TN-LCD screen and the CSTN-LCD screen can achieve the touch function without changing their original configurations.

BRIEF DESCRIPTION OF THE DRAWINGS

In order to illustrate technical solutions in embodiments of the present disclosure or in the conventional technology clearer, the drawings to be used in the description of the embodiments or the conventional technology are briefly described below. Apparently, the drawings in the following description only show some embodiments of the present disclosure, and other drawings may be obtained by those skilled in the art from the disclosed drawings without any creative work.

DETAILED DESCRIPTION

Technical solutions of embodiments of the present disclosure are clearly and completely described in the following in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative work fall in the scope of protection of the present disclosure.

As described in the background, a part of the existing passive display screens (such as STN-LCD screens, TN-LCD screens and CSTN-LCD screens) do not achieve a touch function. It is found by the inventors that those liquid-crystal display screens are commonly used in electronic devices of low costs. In the conventional technology, a touch screen module (including a touch screen and a touch chip) is attached with those liquid-crystal display screens, such that those liquid-crystal display screens may achieve the touch function. However, in this way, a display effect of the liquid-crystal display screen is influenced and the cost of the liquid-crystal display screen is significantly increased, which goes against the low cost.

Figure 1:
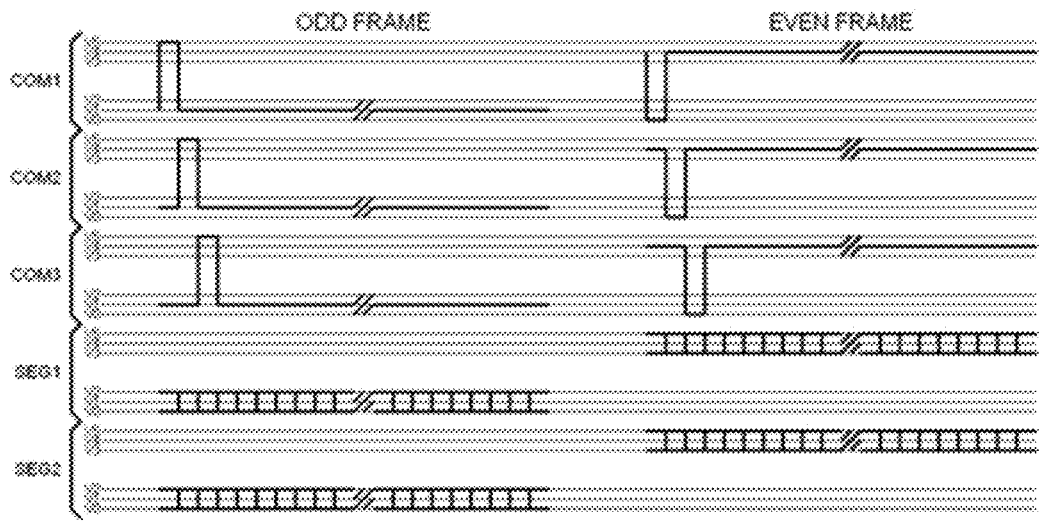
FIG. 1 is a schematic waveform showing driving an STN-LCD screen to display according to the conventional technology.

Based on this, taking the STN-LCD screen as an example, it is found by the inventors that the touch function of the STN-LCD screen can be achieved without adding a touch screen based on display principles of the existing STN-LCD screen. As shown in FIG. 1, the STN-LCD screen is generally driven by using a signal having a waveform similar to that used to drive a capacitive touch panel (CTP). A waveform used in odd frame is symmetric with that used in even frame, such that bad effect of a direct current component on the liquid-crystal display screen can be eliminated.

Taking a waveform of a control voltage changing based on six electrical levels as an example, when a common voltage is in an inactive state, the current common voltage is set as a second preset voltage V1. When a common voltage is in an active state, the current common voltage is set as a sixth preset voltage V5. Common voltages transmitted through different common lines change at a certain interval.

In this embodiment, the second preset voltage V1 is set as an intermediate voltage of a gate voltage (also served as segment line voltage), a third preset voltage V2 is set as a high voltage of the segment line voltage, and a first preset voltage V0 is set as a low voltage of the segment line voltage.

Figure 2:
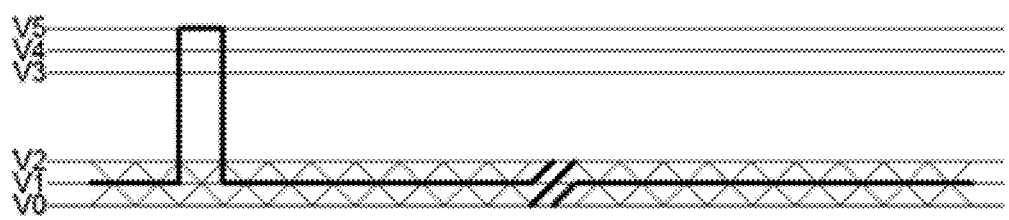
FIG. 2 is a schematic waveform in which waveforms in FIG. 1 are drawn together based on a same time instant.

Waveforms of the common voltage and the segment line voltage shown in FIG. 1 are drawn together based on a same time instant, to obtain a waveform shown in FIG. 2. In FIG. 2, a black thick line denotes a waveform of a common voltage, and a rhombus structure denotes a waveform range of a segment line voltage. That is, the segment line voltage is equal to the third preset voltage V2 or the first preset voltage V0.

Figure 3:
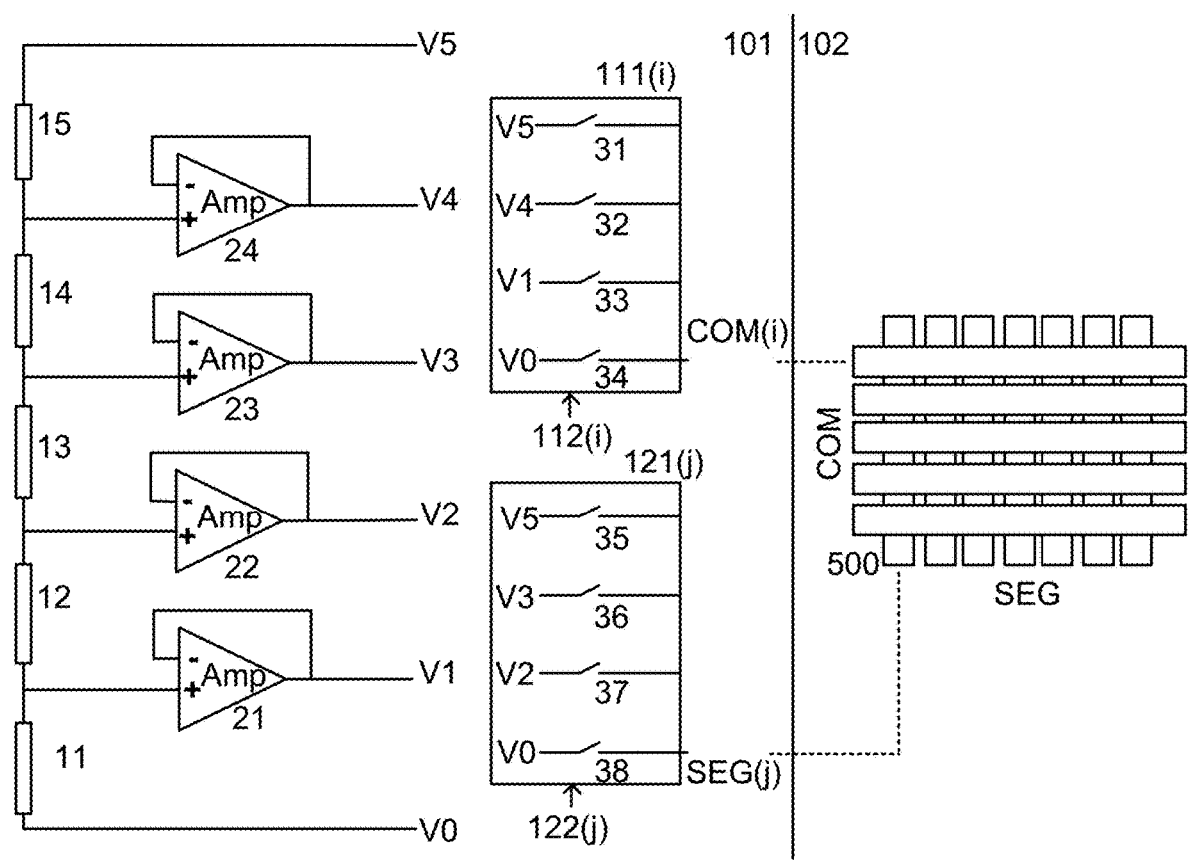
FIG. 3 is a schematic circuit diagram showing a display driving circuit of an STN-LCD screen according to the conventional technology.

Based on the above embodiments, the common voltage may be selected by a driving circuit shown in FIG. 3. For example, when a switch 31 is turned on, a common voltage of a common line COM (i) is equal to the sixth preset voltage V5. When a switch 33 is turned on, the common voltage of the common line COM (i) is equal to the second preset voltage V1.

One common line COM(i) corresponds to one switch group 111(i), where i is a positive integer greater than or equal to one. Accordingly, one segment line SEG(j) (also served as segment line) corresponds to one switch group 121(j), where j is a positive integer greater than or equal to one. Switches in the switch group 111(i) are controlled to be turned on or turned off based on timing 112(i), and switches in the switch group 121(j) are controlled to be turned on or turned off based on timing 122(j), such that the common voltage and the segment line voltage having certain values are outputted. People having ordinary skill in the art should know that the switch group 111(i) is included in a scan driving circuit, which is not depicted in the Figure. Moreover, the scan driving circuit may also include a switch controller for control the switch group 111(i) although it is also not depicted in the Figure. People having ordinary skill in the art should also know that the switch group 121(i) is included in a segment driving circuit, which is not depicted in the Figure, and the segment driving circuit may also include a switch controller for control the switch group 121(i) although it is also not depicted in the Figure.

Schematically, reference is made to FIG. 3, the switch group 111(i) includes the switch 31, a switch 32, the switch 33 and a switch 34. One terminal of the switch 31 is connected to the sixth preset voltage V5. One terminal of the switch 32 is connected to a fifth preset voltage V4. One terminal of the switch 33 is connected to the second preset voltage V1. One terminal of the switch 34 is connected to the first preset voltage V0. Another terminal of the switch 31, another terminal of the switch 32, another terminal of the switch 33, and another terminal of the switch 34 each are connected to the common line COM(i).

The switch group 121(j) includes a switch 35, a switch 36, a switch 37 and a switch 38. One terminal of the switch 35 is connected to the sixth preset voltage V5. One terminal of the switch 36 is connected to a fourth preset voltage V3. One terminal of the switch 37 is connected to a third preset voltage V2. One terminal of the switch 38 is connected to the first preset voltage V0. Another terminal of the switch 35, another terminal of the switch 36, another terminal of the switch 37, and another terminal of the switch 38 each are connected to the segment line SEG(j).

A reference voltage generation circuit is further shown in FIG. 3. The reference voltage generation circuit is configured to generate a preset voltage. For example, desired voltages may be obtained through a resistor voltage division circuit formed by a resistor 11, a resistor 12, a resistor 13, a resistor 14 and a resistor 15. Then, the first preset voltage V0, the second preset voltage V1, the third preset voltage V2, the fourth preset voltage V3, the fifth preset voltage V4, and the sixth preset voltage V5 are obtained by processing the desired voltages through an operational amplifier 21, an operational amplifier 22, an operational amplifier 23 and an operational amplifier 24.

Further, it should be noted that in the embodiments of the present disclosure, a circuit denoted by 101 is arranged inside a chip, while a signal transmission line 500 denoted by 102 is arranged outside the chip (i.e., arranged on a liquid-crystal display screen). That is, the signal transmission line denoted by 102 is connected to a pin of the chip, and then extends to the liquid-crystal display screen via the pin of the chip, to form a wiring pattern denoted by 102 on the liquid-crystal display screen. It should be understood that in this embodiment, the signal transmission line denoted by 102 is described in combination with a display driving circuit 501, so as to facilitate the description.

The reason why the six electrical levels is adopted is the passive LCD panel has no TFT switch on the pixels, and the luminance of the passive LCD is in proportional to the root mean square voltage VRMS between the liquid crystal of the pixel. When the first common line electrode COM1 is high voltage V5, the pixels on the first common line can be only driven by the specific logic low voltage V0 or the specific logic high voltage V2. When the next common line electrode is driven, the first common line electrode COM1 receives a middle voltage V1 from the high voltage V5. Similarly, when the first common line electrode COM1 is driven by an inversion voltage V0, the pixels on the first common line can be only driven by the specific logic voltage V5 or the specific logic voltage V3. When the next common line electrode is driven, the first common line electrode COM1 receives a middle voltage V4 from the inversion voltage V0. It is assumed that there are 100 common lines COM1~COM100, only in one-hundredth of a frame period, it can have a high voltage for one common line. Further, the voltage difference of each pixel only alters between voltage V0 and voltage V2. Their voltage differences are small, such that their root mean square voltage differences are very small. Therefore, the passive LCD panel, such as TN, STN, and so on, generally is adapted for a display, which only has "bright" and "dark", such as the passive display of an office central control panel of air conditioning, a cooler control panel, the dashboard of the car or motorcycle, but not limited thereto. The exemplary example of six electrical levels here is only used to describe the enablement of the present invention but not limited thereto. The other ways, which can make the passive display displayed, should also belongs the spirit of the present invention.

Figure 4A:
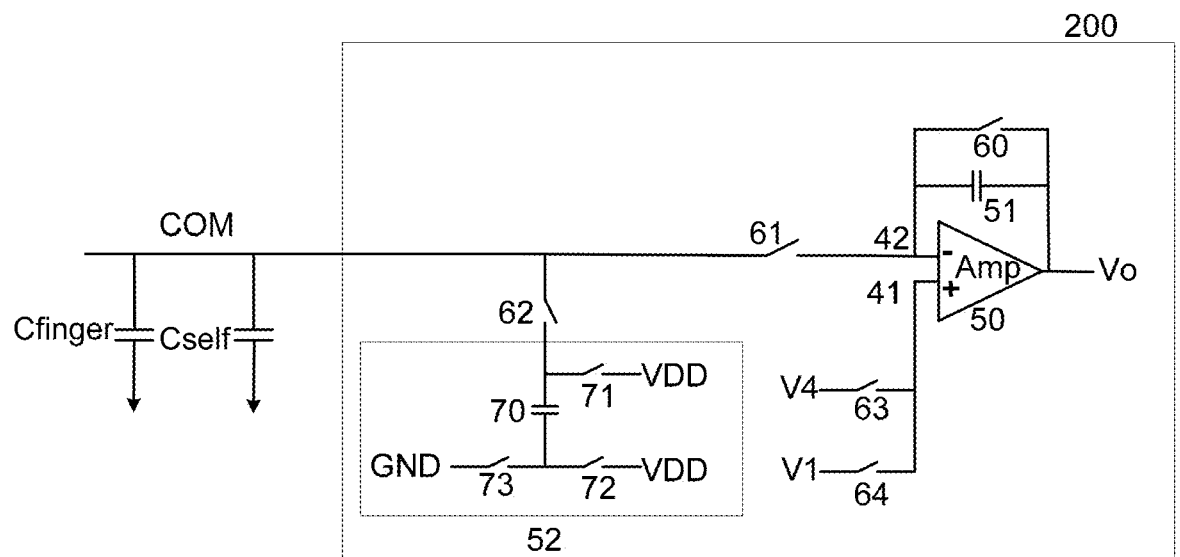
FIG. 4A illustrates a circuit diagram depicting a touch detection circuit of a touch display control circuit of a passive display panel according to a preferred embodiment of the present invention.
Figure 4B:
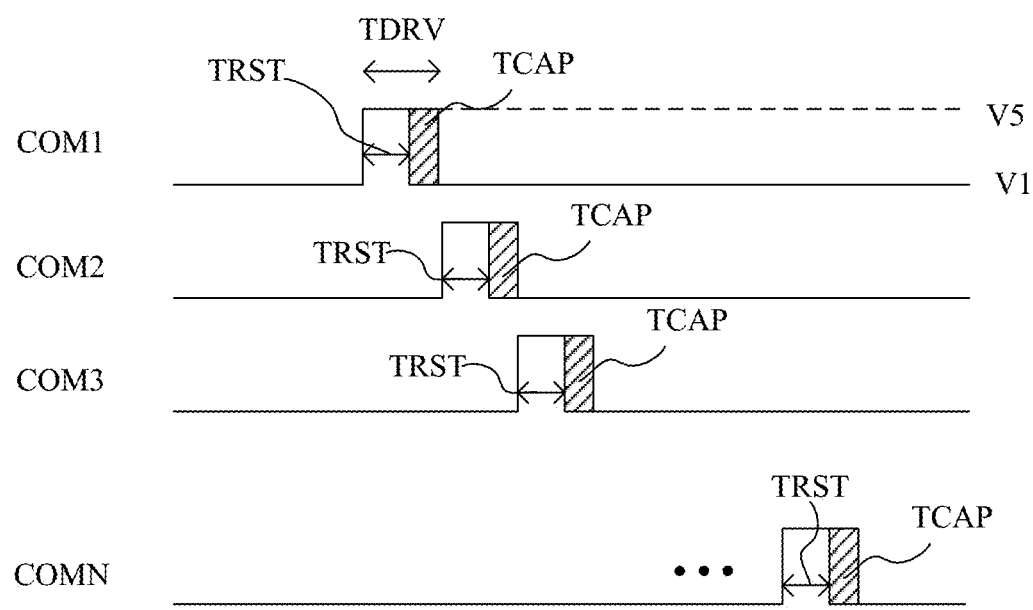
FIG. 4B illustrates an operational waveform depicting a touch detection circuit of a touch display control circuit of a passive display panel according to a preferred embodiment of the present invention.

FIG. 4A illustrates a circuit diagram depicting a touch detection circuit of a touch display control circuit of a passive display panel according to a preferred embodiment of the present invention. FIG. 4B illustrates an operational waveform depicting a touch detection circuit of a touch display control circuit of a passive display panel according to a preferred embodiment of the preset invention. Referring to FIGS. 4A and 4B, the touch detection circuit 200 includes an amplifier 50, a switching capacitor circuit 52, a capacitor 51, and switches 60, 61, 62, 63 and 64. The switching capacitor circuit 52 includes a capacitor 70, switches 71, 72 and 73. Since the switching capacitor circuit 52 can be changed according to different design, the detail description is omitted. In this embodiment, the non-inversion driving voltage V5 for driving common line is served as an example, where the voltage on the common line is second preset voltage V1 when the common line is not been driven. The touch detection is performed on the driving period TDRV in each common line COM1~COM100. TRST represents the reset period of the touch detection circuit 200 and TCAP represent the detection period of the touch detection circuit 200 when the touch detection circuit 200 performs the touch detection. In this embodiment, the period is divided into two periods when the common line COM1~COM100 is driven, the first period is the reset period TRST, the second period is the detection period TCAP. In the reset period TRST, the switches 61 and 62 of the touch detection circuit 200 is cut off and the switch 60 is conducted, where the common line COM is electrically disconnected to the touch detection circuit 200 and the common line COM is electrically connected to the sixth preset voltage V5. The touch detection circuit 200 is reset. At this time, the electric charge quantity Q of the capacitor 51 is equal to 0, the output voltage Vo of the touch detection circuit 200 is equal to the voltage V1 of the positive input terminal 41. The switches 71 and 73 of the switching capacitor circuit 52 are conducted and the switch 72 is cut off. The voltage of the upper terminal of the capacitor 70 is equal to VDD and the voltage of the lower terminal is equal to ground, and the capacitor stores a preset charge. At this time, the common line is driven. In FIG. 4A, Cself represents the self-capacitance of the common line electrode. Thus, the capacitor Cself is charged by the sixth preset voltage V5. Since this example adopts positive polarity driving to serve as an example, the switch 64 is conducted, the switch 63 is cut off, and the voltage of the positive input terminal 41 is equal to the second preset voltage V1.

In the reset period TRST, the voltage of the common line COM would not enter the touch detection circuit 200. At this time, the sixth preset voltage V5 is served as the scan voltage. In the detection period TCAP, the switch 60 of the touch detection circuit 200 is cut off, and the switches 61 and 62 are conducted such that the common line COM is electrically connected to the touch detection circuit 200, where the common line COM is electrically disconnected to the sixth preset voltage V5. And the touch detection circuit 200 performs touch detection. At this time, the switches 71 and 73 are cut off, the switch 72 is conducted, and the lower terminal of the capacitor 70 is coupled to VDD. The voltage of the common line COM is the second preset voltage V1 according to the virtual short of the amplifier 50. It is to be seen that the total electric charge quantity of three parts of circuit shown in FIG. 4A may also be expressed as $Q2=C51*(V1-Vo)+C70*(V1-VDD)+Cself*V1$. Since Q2 is equal to Q1, i.e., Q2=Q1, the Voltage Vo of the output end of the touch circuit may be expressed as $Vo=V1+C70/C51*(V1-2*VDD)+Cself/C51*(V1-V5)$. Cself denotes the self-capacitance of the common line electrode. When a finger touches a display screen, the capacitance changes by Cfinger, and thus the self-capacitance is changed to be Cself=Cself+Cfinger. According to the abovementioned deduction, the output voltage Vo of the touch detection circuit 200 would be changed according to the electric charge equilibrium. Thus, it can be determined whether the common line COM is touched or not. The method for detecting touch may be to detect an output voltage of a certain time point or a time period when the output voltage reach a certain voltage. The detail description is omitted. Further, the switching capacitor circuit 52 may be changed according to different designs, so the present invention is not limited thereto.

In this embodiment, the touch detection and the display scan are performed at the same period. In other words, the touch detection period and the display driving period are overlapped. The reset period TRST and the detection period TCAP are included in the driving period TDRV of the display period. In other words, the resent period TRST and the detection period TCAP share the driving period TRST of the display period. Further, the voltage V5 of the common line in the reset period TRST is different from the voltage V1 of the common line in the detection period TCAP. In addition, according to the abovementioned embodiment, when the longer the detection period is set, the shorter the scan driving period is. The luminance would be reduced accordingly. In a preferred embodiment, the reset period TRST may longer than or equal to the detection period TCAP. In another embodiment, the touch detection of the common line COM may be performed between 2, 3 or K frames, that is, the reduction of the pixel luminance can be reduced or ignored by the abovementioned detection method.

Figure 4C:
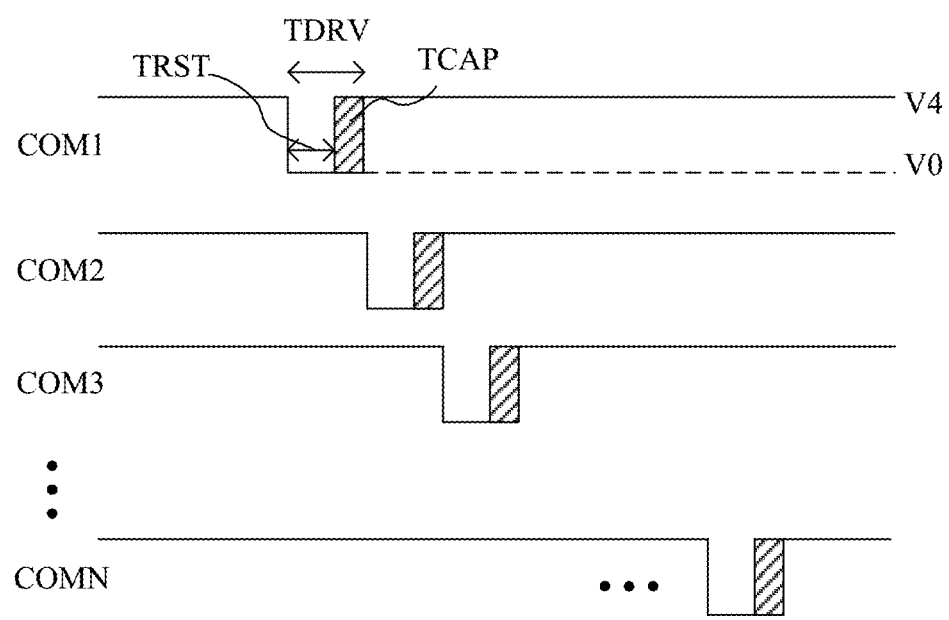
FIG. 4C illustrates an operational waveform depicting a touch detection circuit of a touch display control circuit of a passive display panel according to a preferred embodiment of the present invention.

FIG. 4C illustrates an operational waveform depicting a touch detection circuit of a touch display control circuit of a passive display panel according to a preferred embodiment of the preset invention. Referring to FIG. 4C, similarly, in the abovementioned embodiment, the driving method changes from the positive polarity driving to the negative polarity driving, and the voltage on the common line is third preset voltage V4 when the common line is not been driven. Similarly, the touch detection is performed on the driving period TDRV in each common line COM1~COM100. In the reset period TRST, the switches 61 and 62 of the touch detection circuit 200 is cut off and the switch 60 is conducted, where the common line COM is electrically disconnected to the touch detection circuit 200 and the common line COM is electrically connected to the first preset voltage V0. And the touch detection circuit 200 is reset. At this time, the output voltage Vo of the touch detection circuit 200 is equal to the voltage of the positive input terminal 41. Because the driving method in this embodiment is the negative polarity driving (inversion driving), the switch 63 is conducted and the switch 64 is cut off. The voltage of the positive input terminal 41 is equal to the third preset voltage V4. In the reset period TRST, the voltage of the common line COM would not enter the touch detection circuit. At this time, the voltage V0 of the common line COM is for scan driving. In the detection period TCAP, the switch 60 of the touch detection circuit is cut off, and the switches 61 and 62 are conducted such that the common line COM is electrically connected to the touch detection circuit 200, where the common line COM is electrically disconnected to the first preset voltage V0. The voltage V0 of the common line is conducted into the negative input terminal 42 of the amplifier and the switching capacitor circuit 52. The output voltage Vo of the touch detection circuit 200 would be changed according to the electric charge equilibrium. Thus, it can be determined whether the common line COM is touched or not. The method for detecting touch may be to detect an output voltage of a certain time point or a time period when the output voltage reach a certain voltage. The detail description is omitted. Further, the switching capacitor circuit 52 may be changed according to different designs, so the present invention is not limited thereto.

Based on the above and in conjunction with driving principles of a touch circuit 200 shown in FIG. 4, during first timing, a switch 61 and a switch 62 are controlled to be turned off, and a switch 64 is controlled to be turned on. One terminal of the switch 64 is connected to the second preset voltage V1. Another terminal of the switch 64 is connected to a non-inverting input terminal 41 of an amplifier 50. One terminal of a switch 60 is connected to an inverting input terminal of the amplifier 50. Another terminal of the switch 60 is connected to an output end of the touch circuit. In this case, when the switch 60 is turned on, the amplifier 50 performs an Auto-zero operation. The Electric charge quantity of a capacitor 51 is equal to zero. Voltage Vo of the output end of the touch circuit is equal to the second preset voltage V1, i.e., Vo=V1.

When a switch 71 and a switch 73 are turned on, and a switch 72 is turned off, an upper terminal of a capacitor 70 is connected to a voltage VDD, and a lower terminal of the capacitor 70 is grounded, to store predetermined electric charge. A common line COM is connected to the sixth preset voltage V5, to perform a pre-charge operation. It is to be seen that a total electric charge quantity of three parts of circuit shown in FIG. 4 may be expressed as Q1=0+ C70*VDD+Cself*V5, where Cself denotes a self-capacitance of a common electrode.

During a second timing, the switch 61 and the switch 62 are controlled to be turned on. In this case, the switch 60 is turned off, and the amplifier 50 performs a detection operation.

When a switch 71 and the switch 73 are turned off, and the switch 72 is turned on, the lower terminal of the capacitor 70 is connected to the voltage VDD. In this case, the voltage of the common line COM is kept to be equal to the second preset voltage V1 due to virtual ground effect of the amplifier 50.

It is to be seen that the total electric charge quantity of three parts of circuit shown in FIG. 4 may also be expressed as Q2=C51*(V1−Vo)+C70*(V1−VDD)+Cself*V1.

Since Q2 is equal to Q1, i.e., Q2=Q1, the Voltage Vo of the output end of the touch circuit may be expressed as Vo=V1+C70/C51*(V1−2*VDD)+Cself/C51*(V1−V5). Cself denotes the self-capacitance. When a finger touches a touch screen, the capacitance changes by Cfinger, and thus the self-capacitance is changed to be Cself=Cself+Cfinger. Details are not described herein.

Therefore, based on the above circuit, touch events can be detected by detecting change of voltage of an output terminal of the amplifier.

Figure 5:
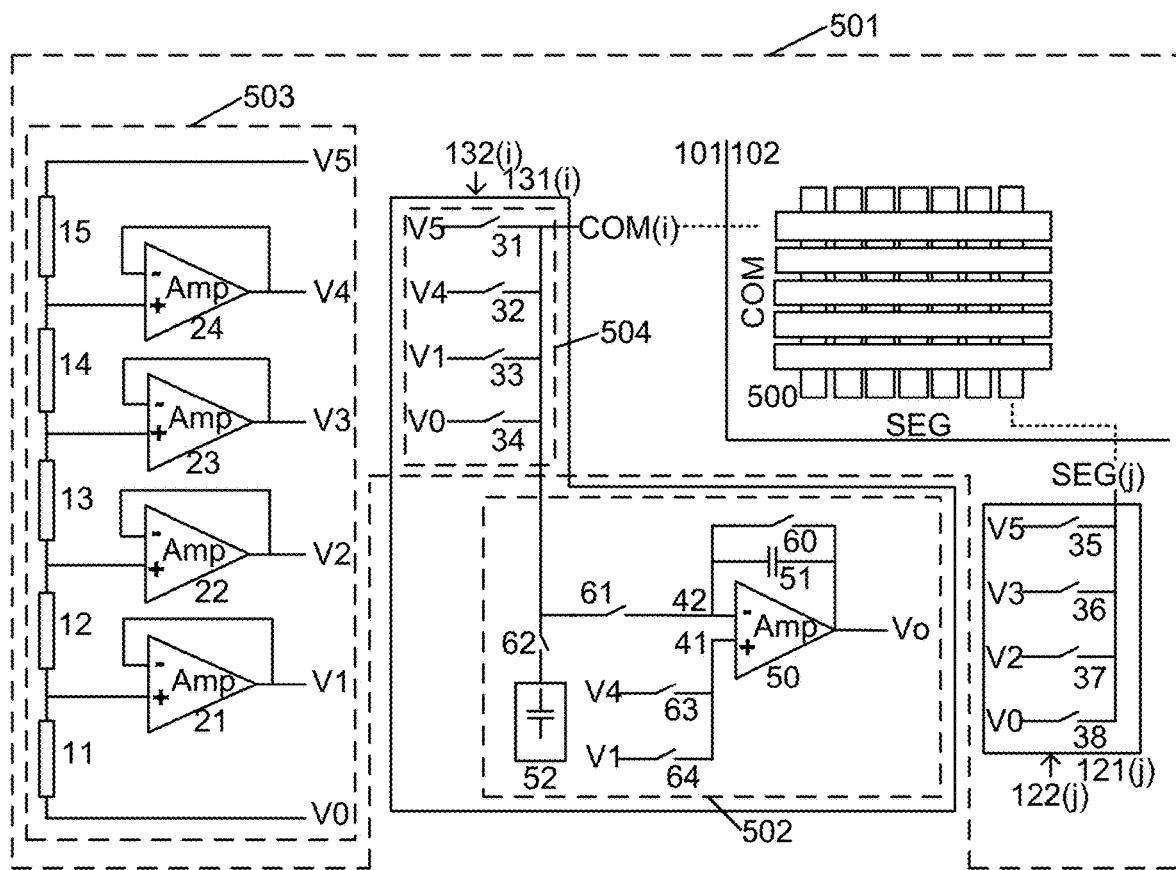
FIG. 5 is a schematic diagram showing a touch display control circuit according to an embodiment of the present disclosure.

The above-described touch circuit is integrated with the driving circuit by the inventors. As shown in FIG. 5, a touch display control circuit is provided according to an embodiment of the present disclosure. The touch display control circuit is configured to drive a liquid crystal display screen. The touch display control circuit includes a display driving circuit 501 and a touch detection circuit 502.

The display driving circuit 501 includes a signal transmission line 500, a signal selection circuit (504 and 121(j)), and a reference voltage generation circuit 503. The signal transmission line 500 is configured to transmit a segment signal and a common signal. The signal selection circuit (504 and 121(j)) is configured to select a preset control voltage based on display control timing 122(j) or touch control timing 132(i). The reference voltage generation circuit 503 is connected to the signal selection circuit (504 and 121(j)) and is configured to provide the preset control voltage. The touch detection circuit 502 is connected to the signal selection circuit 504 and is configured to perform touch detection based on the touch control timing.

It is to be seen that with the touch display control circuit provided in the present disclosure, the display driving circuit is combined with the touch detection circuit, such that a liquid crystal display screen can achieve a touch function without changing its original configurations.

The signal selection circuit provided in embodiments of the present disclosure may be implemented in multiple ways. As shown in FIG. 5, a signal selection circuit provided in this embodiment includes a segment signal selection sub-circuit 121(j) and a common electrode signal selection sub-circuit 504. The segment signal selection sub-circuit 121(j) is connected to the reference voltage generation circuit 503, and is configured to select a target segment voltage based on the display control timing 122(j) and transmit the target segment voltage to a segment line SEG in the signal transmission line. The common electrode signal selection sub-circuit 504 is connected to the reference voltage generation circuit 503, and is configured to select a target common voltage based on the display control timing 122(j) or the touch control timing 132(i), and transmit the target common voltage to a common line COM in the signal transmission line 500.

It should be noted that as shown in FIG. 5, the touch display control circuit provided in this embodiment includes multiple touch detection circuits 502. Specifically, each common line COM(i) is connected to one common electrode signal selection sub-circuit 504, and each common electrode signal selection sub-circuit 504 is connected to one of the multiple touch detection circuits 502. That is, in this embodiment, the number of the common electrode signal selection sub-circuit 504 is equal to the number of the touch detection circuit 502. The common electrode signal selection sub-circuit 504 and the touch detection circuit 502 form a first circuit 131(i).

Based on the above embodiments, specific implementations of the common electrode signal selection sub-circuit 504 and the segment signal selection sub-circuit 121(j) are provided according to an embodiment of the present disclosure. The common electrode signal selection sub-circuit 504 includes a first switch 31, a second switch 32, a third switch 33 and a fourth switch 34. The segment signal selection sub-circuit 121(j) includes a fifth switch 35, a sixth switch 36, a seventh switch 37 and an eighth switch 38.

A first terminal of the first switch 31, a first terminal of the second switch 32, a first terminal of the third switch 33, and a first terminal of the fourth switch 34 are connected to one common line COM(i).

A second terminal of the first switch 31, a second terminal of the second switch 32, a second terminal of the third switch 33, and a second terminal of the fourth switch 34 are connected to the sixth preset voltage V5, the fifth preset voltage V4, the second preset voltage V1 and the first preset voltage V0, respectively.

A control terminal of the first switch 31, a control terminal of the second switch 32, a control terminal of the third switch 33, and a control terminal of the fourth switch 34 are controlled based on the display control timing 122(j) or the touch control timing 132(i).

A first terminal of the fifth switch 35, a first terminal of the sixth switch 36, a first terminal of the seventh switch 37, and a first terminal of the eighth switch 38 are connected to one segment line SEG(j).

A second terminal of the fifth switch 35, a second terminal of the sixth switch 36, a second terminal of the seventh switch 37, and a second terminal of the eighth switch 38 are connected to the sixth preset voltage V5, the fourth preset voltage V3, the third preset voltage V2 and the first preset voltage V0, respectively.

A control terminal of the fifth switch, a control terminal of the sixth switch, a control terminal of the seventh switch, and a control terminal of the eighth switch each are controlled based on the display control timing 122(j).

Figure 6:
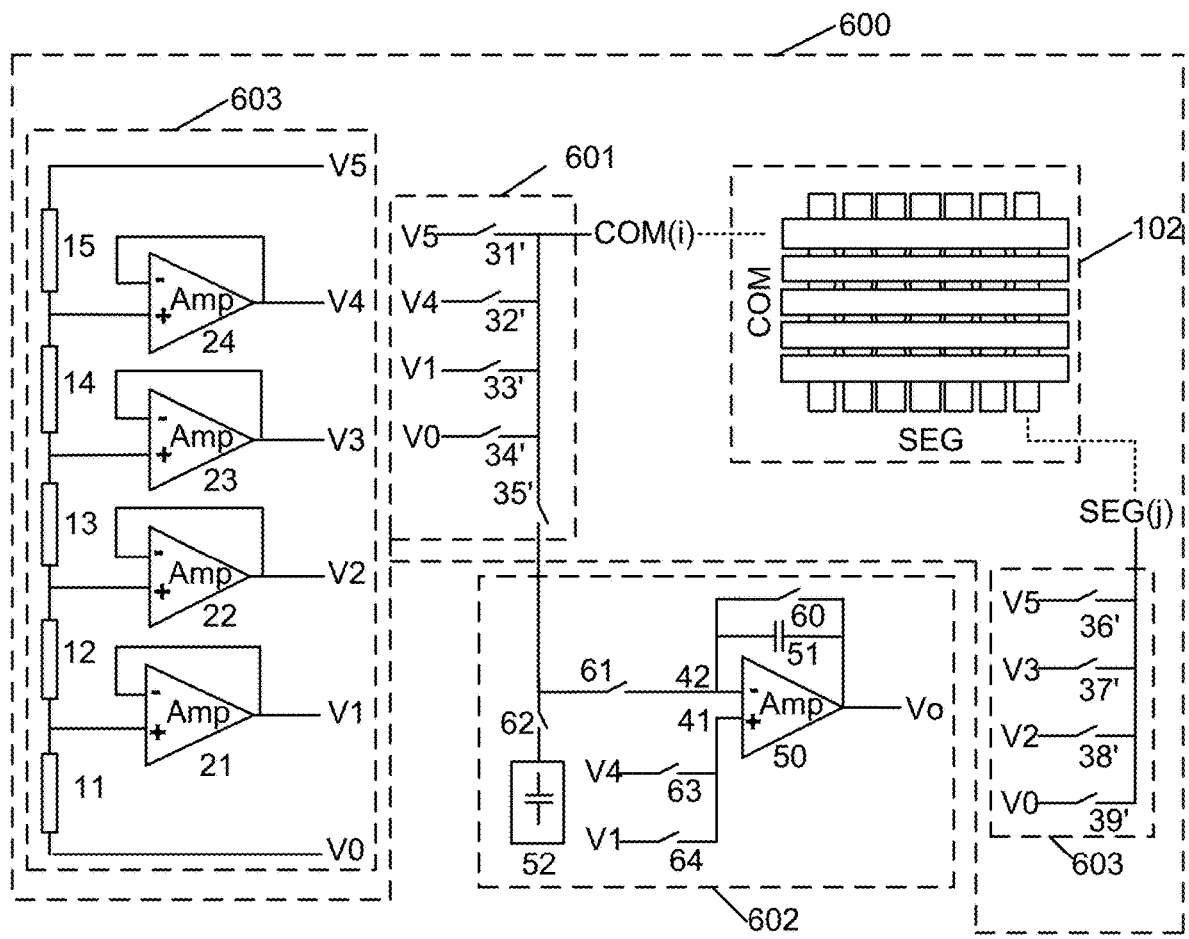
FIG. 6 is a schematic diagram showing a touch display control circuit according to another embodiment of the present disclosure.

It should be noted that the number of the touch detection circuits is equal to or greater than two in this embodiment. Alternatively, there may be only one touch detection circuit. As shown in FIG. 6, each common line COM(i) is connected to one common electrode signal selection sub-circuit 601. Multiple common electrode signal selection sub-circuits 601 are connected to one touch detection circuit 602. In this way, the number of the touch detection circuits 602 can be reduced, thereby reducing a chip size.

Specific implementations of the common electrode signal selection sub-circuit 601 and the segment signal selection sub-circuit 603 are provided according to an embodiment of the present disclosure. The common electrode signal selection sub-circuit 601 includes a ninth switch 31', a tenth switch 32', an eleventh switch 33', a twelfth switch 34' and a thirteenth switch 35'. The segment signal selection subcircuit 603 includes a fourteenth switch 36', a fifteenth switch 37', a sixteenth switch 38' and a seventeenth switch 39'.

A first terminal of the ninth switch 31', a first terminal of the tenth switch 32', a first terminal of the eleventh switch 33', a first terminal of the twelfth switch 34' and a first terminal of the thirteenth switch 35' are connected to one common line COM(i).

A second terminal of the ninth switch 31', a second terminal of the tenth switch 32', a second terminal of the eleventh switch 33', and a second terminal of the twelfth switch 34' are connected to the sixth preset voltage V5, the fifth preset voltage V4, the second preset voltage V1 and the first preset voltage V0, respectively.

A control terminal of the ninth switch 31', a control terminal of the tenth switch 32', a control terminal of the eleventh switch 33', and a control terminal of the twelfth switch 34' are controlled based on the display control timing or the touch control timing.

A second terminal of the thirteenth switch 35' is connected to the touch detection circuit 602.

A first terminal of the fourteenth switch 36', a first terminal of the fifteenth switch 37', a first terminal of the sixteenth switch 38', and a first terminal of the seventeenth switch 39' are connected to one segment line SEG(j).

A second terminal of the fourteenth switch 36', a second terminal of the fifteenth switch 37', a second terminal of the sixteenth switch 38', and a second terminal of the seventeenth switch 39' are connected to the sixth preset voltage V5, the fourth preset voltage V3, the third preset voltage V2 and the first preset voltage V0, respectively.

A control terminal of the fourteenth switch 36', a control terminal of the fifteenth switch 37', a control terminal of the sixteenth switch 38', and a control terminal of the seventeenth switch 39' are controlled based on the display control timing.

Figure 7:
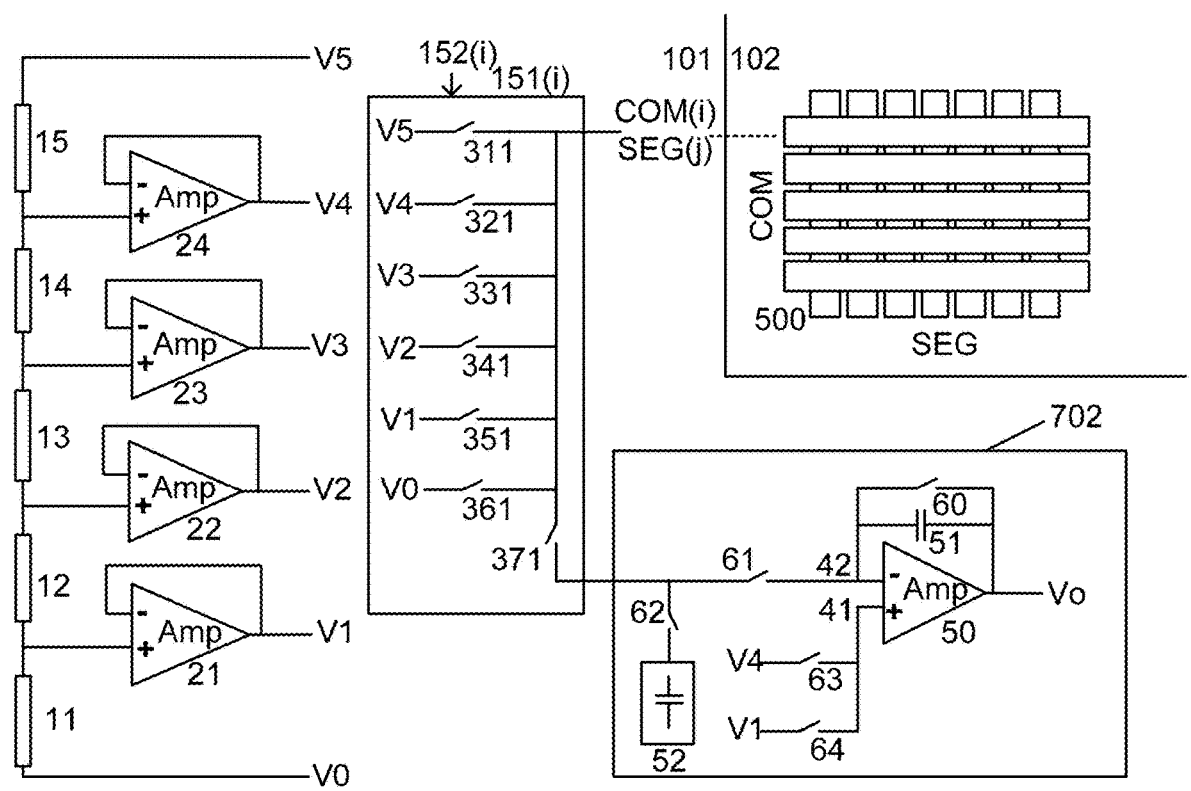
FIG. 7 is a schematic diagram showing a touch display control circuit according to another embodiment of the present disclosure.

Based on the above embodiment, a specific implementation of the signal selection circuit is provided according to an embodiment of the present disclosure. As shown in FIG. 7, a signal selection circuit 151(i) includes multiple switches. A control terminal of each of the multiple switches may be controlled based on the display control timing or the touch control timing, to select a preset control voltage and transmit the selected preset control voltage to the signal transmission line 500.

The signal selection circuit includes an eighteenth switch 311, a nineteenth switch 321, a twentieth switch 331, a twenty-first switch 341, a twenty-second switch 351, a twenty-third switch 361 and a twenty-fourth switch 371.

A first terminal of the eighteenth switch 311, a first terminal of the nineteenth switch 321, a first terminal of the twentieth switch 331, a first terminal of the twenty-first switch 341, a first terminal of the twenty-second switch 351, a first terminal of the twenty-third switch 361 and a first terminal of the twenty-fourth switch 371 are connected to one common line COM(i) or one segment line SEG(j).

A second terminal of the eighteenth switch 311, a second terminal of the nineteenth switch 321, a second terminal of the twentieth switch 331, a second terminal of the twenty-first switch 341, a second terminal of the twenty-second switch 351, a second terminal of the twenty-third switch 361 and a second terminal of the twenty-fourth switch 371 are connected to the sixth preset voltage V5, the fifth preset voltage V4, the fourth preset voltage V3, the third preset voltage V2, the second preset voltage V1 and the first preset voltage V0, respectively.

A control terminal of the eighteenth switch 311, a control terminal of the nineteenth switch 321, a control terminal of the twentieth switch 331, a control terminal of the twenty-first switch 341, a control terminal of the twenty-second switch 351 and a control terminal of the twenty-third switch 361 are controlled based on the display control timing or touch control timing 152(i).

A second terminal of the twenty-fourth switch 371 is connected to the touch detection circuit 702.

Similarly, in this embodiment, each signal selection circuit 151(i) may correspond to one touch detection circuit 702. Alternatively, multiple signal selection circuits 151(i) may correspond to one touch detection circuit 702.

The number of the touch detection circuits 702 is equal to or greater than two. Each common line COM(i) is connected to one of the multiple signal selection circuits 151(i), and each of the multiple signal selection circuits 151(i) is connected to any one of the multiple touch detection circuits 702. Alternatively, each common line COM(i) is connected to one of the multiple signal selection circuits 151(i), and multiple signal selection circuits 151(i) are connected to one touch detection circuit 702.

Based on the above embodiments, reference is made to FIGS. 5 to 7, a specific implementation of a reference voltage generation circuit (503 or 603) is provided according to an embodiment of the present disclosure. The reference voltage generation circuit includes a first resistor 11, a second resistor 12, a third resistor 13, a fourth resistor 14, a fifth resistor 15; and a first amplifier 21, a second amplifier 22, a third amplifier 23 and a fourth amplifier 24.

A first terminal of the first resistor 11 serves as an output end for the first preset voltage V0.

A second terminal of the first resistor 11 is connected to a non-inverting input terminal of the first amplifier 21 and a first terminal of the second resistor 12. An inverting input terminal of the first amplifier 21 is connected to an output terminal of the first amplifier 21, serving as an output end for the second preset voltage V1.

A second terminal of the second resistor 12 is connected to a non-inverting input terminal of the second amplifier 22 and a first terminal of the third resistor 13. An inverting input terminal of the second amplifier 22 is connected to an output terminal of the second amplifier 22, serving as an output end for the third preset voltage V2.

A second terminal of the third resistor 13 is connected to a non-inverting input terminal of the third amplifier 23 and a first terminal of the fourth resistor 14. An inverting input terminal of the third amplifier 23 is connected to an output terminal of the third amplifier 23, serving as an output end for the fourth preset voltage V3.

A second terminal of the fourth resistor 14 is connected to a non-inverting input terminal of the fourth amplifier 24 and a first terminal of the fifth resistor 15. An inverting input terminal of the fourth amplifier 24 is connected to an output terminal of the fourth amplifier 24, serving as an output end for the fifth preset voltage V4.

The desired voltages may be obtained through a resistor voltage division circuit formed by the first resistor 11, the second resistor 12, the third resistor 13, the fourth resistor 14 and the fifth resistor 15. Then, the first preset voltage V0, the second preset voltage V1, the third preset voltage V2, the fourth preset voltage V3, the fifth preset voltage V4, and the sixth preset voltage V5 are obtained by processing the desired voltages through the first operational amplifier 21, the second operational amplifier 22, the third operational amplifier 23 and the fourth operational amplifier 24.

Further, it should be noted that in the embodiments of the present disclosure, the circuit denoted by 101 is arranged inside a chip, while the signal transmission line 500 denoted by 102 is arranged outside the chip (i.e., arranged on a liquid-crystal display screen). That is, the signal transmission line denoted by 102 is connected to the pin of the chip, and then extends to the liquid-crystal display screen via the pin of the chip, to form the wiring pattern denoted by 102 on the liquid-crystal display screen. It should be understood that, in this embodiment, the signal transmission line denoted by 102 is described in combination with the display driving circuit 501, so as to facilitate the description.

A specific implementation of the touch detection circuit is further provided according to an embodiment of the present disclosure. The touch detection circuit includes an amplifier and multiple switches.

The amplifier is configured to detect a change of self-capacitance of a common electrode and output a voltage signal corresponding to the change of the self-capacitance.

Reference is made to FIG. 5, the touch detection circuit may include a first capacitor 51, a second capacitor 52, a fifth amplifier 50, a twenty-fifth switch 60, a twenty-sixth switch 61, a twenty-seventh switch 62, a twenty-eighth switch 63 and a twenty-ninth switch 64.

The twenty-fifth switch 60 and the first capacitor 51 are connected in parallel between an inverting input terminal and an output terminal of the fifth amplifier 50. The output terminal of the fifth amplifier 50 serves as an output end of the touch detection circuit 502.

The inverting input terminal of the fifth amplifier 50 is connected to a signal selection circuit 131($i$) via the twenty-sixth switch 61. The signal selection circuit 131($i$) is connected to the second capacitor 52 via the twenty-seventh switch 62.

A non-inverting input terminal of the fifth amplifier 50 is connected to the fifth preset voltage V4 via the twenty-eighth switch 63, and is connected to the second preset voltage V1 via the twenty-ninth switch 64.

In combination with the above circuit structure, operating principles of the solution are described as follows.

During a period of display timing, the display driving circuit is controlled to be in an on-state and the touch detection circuit is controlled to be in an off-state and a self-correction state based on the display control timing, to select the preset control voltage, such that the display driving circuit outputs the preset control voltage to the signal transmission line.

The first switch 31 may be controlled to be turned on, such that the common line COM(i) is connected to the sixth preset voltage V5. In this case, a common voltage COM in an active state is equal to the sixth preset voltage V5. When the twenty-seventh switch 62 is controlled to be turned on, the second capacitor 52 stores predetermined electric charge. When the twenty-ninth switch 64 is controlled to be turned on, the second preset voltage V1 is connected to the non-inverting input terminal of the fifth amplifier 50, such that the fifth amplifier 50 performs the automatic zero cleaning operation.

During a period of display touch timing, the touch detection circuit 502 is controlled to perform touch detection based on the touch control timing.

The period of display touch timing includes a first sub-period and a second sub-period.

During the first sub-period, the display driving circuit 501 is in the on-state, and the touch detection circuit 502 is in the off-state and the self-correction state. In this case, the inverting input terminal of the fifth amplifier 50 in the touch detection circuit 502 is connected to the output terminal of the fifth amplifier 50, such that a voltage of the output terminal of the fifth amplifier 50 is kept to be equal to a certain voltage, such as the second preset voltage V1.

During the second sub-period, the touch detection circuit 502 performs the touch detection. In this case, the common voltage of the com line COM(i) is connected to the inverting input terminal of the fifth amplifier 50. A voltage of the inverting input terminal of the fifth amplifier 50 is equal to a voltage of the non-inverting input terminal of the fifth amplifier 50, due to the virtual ground effect of the fifth amplifier 50 when operating normally. In this case, a voltage of the common line COM(i) can be kept to be equal to the above-described certain voltage, for example, the second preset voltage V1, by connecting the non-inverting input terminal of the fifth amplifier 50 to a proper voltage. In this case, the touch detection circuit 502 can achieve normal display function and can perform capacitance detection.

Schematically, the first switch 31, the second switch 32, the third switch 33, the fourth switch 34, the fifth switch 35, the sixth switch 36, the seventh switch 37 and the eighth switch 38 each are controlled to be turned off, and the twenty-fifth switch 60, the twenty-sixth switch 61, the twenty-seventh switch 62, and the twenty-ninth switch 64 each are controlled to be turned on, such that the touch detection circuit outputs a target voltage based on a touch action.

It is to be seen that with the touch display control circuit provided in the present disclosure, the STN-LCD screen, the TN-LCD screen and the CSTN-LCD screen can achieve the touch function without changing their original configurations.

Figure 8:
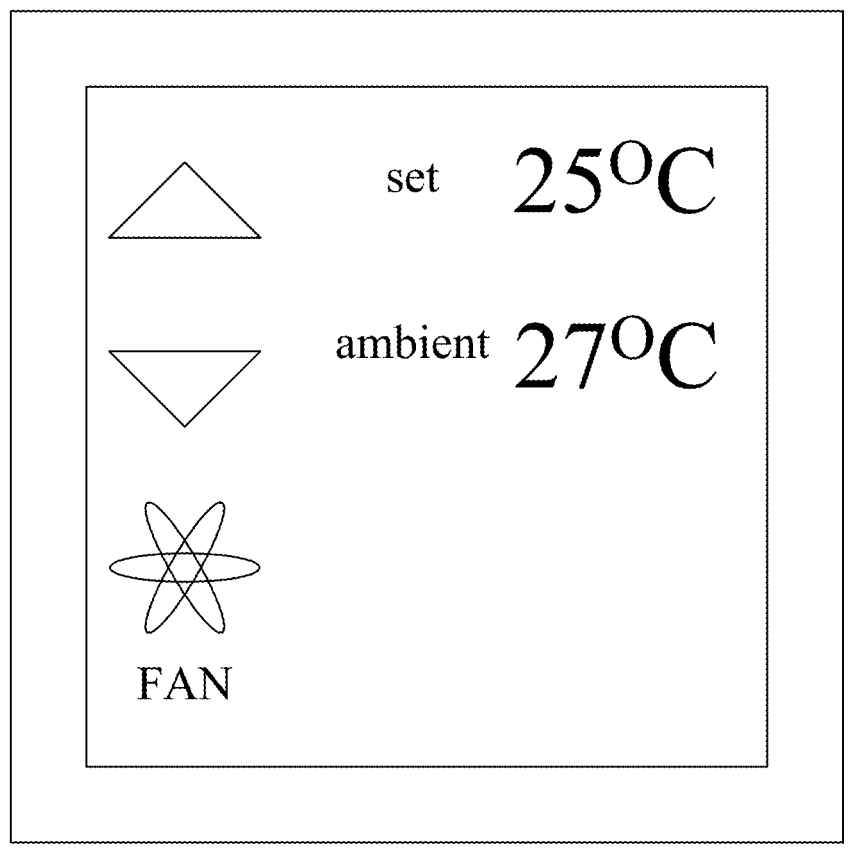
FIG. 8 is a schematic structural diagram of an electronic device according to an embodiment of the present disclosure.

Based on the above embodiments, as shown in FIG. 8, an electronic device is further provided in the present disclosure. The electronic device includes a body and the above-described touch display control circuit. The electronic device may be a control panel of an air conditioner with touch function or a digital watch with touch function. The electronic device is capable of performing touch function with a slight modification and low cost in accordance with the embodiments of the present disclosure.

In the abovementioned embodiment, the first preset voltage V0, the second preset voltage V1, the third preset voltage V2, the fourth preset voltage V3, the fifth preset voltage V4 and the sixth preset voltage V5 are served as an example, people having ordinary skill in the art should know that the number of the preset voltage can be changed or modified according to different designs or requirements. Thus, the present invention is not limited thereto. Moreover, the abovementioned embodiment adopts to scan common lines to serve as an example, however, the common lines and the segment lines may be intersected and there is no device between the common lines and the segment lines. Thus, if the driving circuit can switch the driving method from the common lines COM to the segment lines SEG, that is, the scan lines becomes the segment lines, the present invention can also detects whether the segment lines are touched or not. In other words, 2-dimension touch detection may be performed in the present invention. Furthermore, the abovementioned embodiment is only an exemplary example. Generally, 2-dimension touch detection may be unnecessary in the low cost touch display. ICON Type and 1-dimension touch detection function may already be sufficient to be applied to a general dashboard panels.

In summary, a touch display control circuit, a control method and an electronic device are provided in the present disclosure. The touch display control circuit is configured to drive the STN-LCD screen, the TN-LCD screen and the CSTN-LCD screen. The touch display control circuit includes a display driving circuit and a touch detection circuit. The display driving circuit includes a signal transmission line, multiple groups of signal selection circuits and a reference voltage generation circuit. The signal transmission line is configured to transmit a gate signal and a common signal. The signal selection circuit is configured to select a preset control voltage based on display control timing or touch control timing. The reference voltage generation circuit is configured to provide the preset control voltage. The touch detection circuit is connected to the multiple groups of signal selection circuits and is configured to detect a to-be-tested touch signal based on the touch control timing. It is to be seen that with the touch display control circuit provided in the present disclosure, the STN-LCD screen and so on can achieve the touch function without changing the original configurations.

The embodiments of the specification are described in a progressive manner, with the emphasis of each of the embodiments on the difference from the other embodiments. Hence, for the same or similar parts between the embodiments, one embodiment can be understood with reference to the other embodiments. Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A touch display control circuit for driving a passive display panel, comprising:
   a display driving circuit, wherein the display driving circuit comprises:
      a reference voltage generation circuit, for generating a plurality of preset control voltages;
      a scan line driving circuit, for sequentially driving common lines of the passive display panel by at least one of preset control voltages;
      a segment driving circuit, for driving segment lines of the passive display panel by the preset control voltages according to corresponding pixel data; and
      a touch detection circuit, coupled to at least a common line of the passive display panel,
   wherein, a specific period for driving a specific common line is divided into a reset period and a detection period,
   wherein the specific common line is electrically connected to one of preset control voltages by the scan line driving circuit in the reset period, where the touch detection circuit is reset,
   wherein the specific common line is electrically connected to the touch detection circuit in order to perform touch detection in the detection period.

2. The touch display control circuit according to claim 1, wherein the reference voltage generation circuit is for generating at least a first preset voltage, a second preset voltage, a third preset voltage and a sixth preset voltage.

3. The touch display control circuit according to claim 2, wherein the scan line driving circuit comprises:
   a common electrode signal selection sub-circuit, coupled to the reference voltage generation circuit, wherein the common electrode signal selection sub-circuit transmits the sixth preset voltage to the specific common line when the specific common line is driven, and the common electrode signal selection sub-circuit transmits the second preset voltage to the specific common line when the specific common line is not driven.

4. The touch display control circuit according to claim 2, wherein the specific common line is driven by the sixth preset voltage, after a predetermined period, a touch detection is performed on the common line, wherein the predetermined period is shorter than the period when the specific common line is driven by the sixth preset voltage.

5. The touch display control circuit according to claim 2, wherein the reference voltage generation circuit is for generating at least a fourth preset voltage and a fifth preset voltage,
   wherein, in an odd frame, the scan line driving circuit is for sequentially driving common lines of the passive display panel by sixth preset voltage, the second preset voltage is provided to the common lines, which are not be driven, to serve as common voltage, wherein segment line driving circuit is for providing a first preset voltage or a third preset voltage to the corresponding segment line of the passive display panel according to the pixel data,
   wherein, in an even frame, the scan line driving circuit is for sequentially driving common lines of the passive display panel by first preset voltage, the fifth preset voltage is provided to the common lines, which are not be driven, to serve as common voltage, wherein segment line driving circuit is for providing a fourth preset voltage or a sixth preset voltage to the corresponding segment line of the passive display panel according to the pixel data.

6. The touch display control circuit according to claim 2, wherein the reference voltage generation circuit is for generating at least a fourth preset voltage and a fifth preset voltage,
   wherein, in an even frame, the scan line driving circuit is for sequentially driving common lines of the passive display panel by sixth preset voltage, the second preset voltage is provided to the common lines, which are not be driven, to serve as common voltage, wherein segment line driving circuit is for providing a first preset voltage or a third preset voltage to the corresponding segment line of the passive display panel according to the pixel data,
   wherein, in an odd frame, the scan line driving circuit is for sequentially driving common lines of the passive display panel by first preset voltage, the fifth preset voltage is provided to the common lines, which are not be driven, to serve as common voltage, wherein segment line driving circuit is for providing a fourth preset voltage or a sixth preset voltage to the corresponding segment line of the passive display panel according to the pixel data.

7. The touch display control circuit according to claim 1, wherein the touch detection circuit comprises:
   a first capacitor, comprising a first terminal and a second terminal, wherein the second terminal of the first capacitor is coupled to a common voltage;
   a switch circuit, coupled between common lines of the passive display panel and the first terminal of the first capacitor;

a first discharging circuit, comprising a first terminal and a second terminal, wherein the first terminal of the first discharging circuit is coupled to the first terminal of the first capacitor, and the second terminal of the first discharging circuit is coupled to the second terminal of the first capacitor;

an operational amplifier, comprising a first input terminal, a second input terminal and an output terminal, wherein the first input terminal of the operational amplifier is coupled to the first terminal of the first capacitor, the second input terminal of the operational amplifier is coupled to a reference voltage;

a second capacitor, comprising a first terminal and a second terminal, wherein the first terminal of the second capacitor is coupled to the first input terminal of the operational amplifier, the second terminal of the second capacitor is coupled to the output terminal of the operational amplifier;

a second discharging circuit, comprising a first terminal and a second terminal, wherein the first terminal of the second discharging circuit is coupled to the first terminal of the second capacitor, and the second terminal of the second discharging circuit is coupled to the second terminal of the second capacitor, wherein, when the specific common line is driven by the sixth preset voltage, after a predetermined period, the touch detection is performed on the specific common line, wherein the predetermined period is shorter than the time when the specific common line is driven by the sixth preset voltage, wherein, when the touch detection is performed on the specific common line, the first discharging circuit and the second discharging circuit are conducted, and then the first discharging circuit and the second discharging circuit are cut off, such that it is determine whether the specific common line is touched or not.

8. A touch detection method, adapted for a passive display panel, comprising:

providing a plurality of preset voltages;

sequentially driving common line of the passive display panel by a specific preset voltage; and when a specific common line is driven on a specific period, performing a self-capacitance detection, wherein the specific period is divided into a reset period and a detection period, wherein, in the reset period, the specific common line is driven by the specific preset voltage, in the detection period, the specific common line is electrically connected to a touch detection circuit for touch detection, wherein the reset period and the detection period are included in a display period, and the voltage of specific common line in the reset period is not equal to the voltage in the detection period.

9. The method according to claim 8, wherein, in the reset period, the specific common line is electrically connected to the specific preset voltage by a scan line driving circuit, and wherein, in the detection period, the specific common line is electrically connected to the touch detection circuit for performing touch detection.

10. The method according to claim 8, wherein providing a plurality of preset voltages comprises:

providing at least a first preset voltage, a second preset voltage, a third preset voltage and a sixth preset voltage, wherein sequentially driving common line of the passive display panel by a specific preset voltage comprises:

sequentially driving common line of the passive display panel by the sixth preset voltage, wherein the second preset voltage is provided to the common lines, which are not be driven, to serve as common voltage.

11. The method according to claim 10, further comprising:

providing at least a fourth preset voltage and a fifth preset voltage;

wherein, in an odd frame, common lines of the passive display panel are driven by sixth preset voltage, the second preset voltage is provided to the common lines, which are not be driven, to serve as common voltage, wherein the first preset voltage or the third preset voltage is provided to the corresponding segment line of the passive display panel according to the pixel data, wherein, in an even frame, common lines of the passive display panel are sequentially driven by first preset voltage, the fifth preset voltage is provided to the common lines, which are not be driven, to serve as common voltage, wherein the fourth preset voltage or the sixth preset voltage line is provided to the corresponding segment line of the passive display panel according to the pixel data.

12. The method according to claim 10, further comprising:

providing at least a fourth preset voltage and a fifth preset voltage;

wherein, in an even frame, common lines of the passive display panel are sequentially driven by sixth preset voltage, the second preset voltage is provided to the common lines, which are not be driven, to serve as common voltage, wherein the first preset voltage or the third preset voltage is provided to the corresponding segment line of the passive display panel according to the pixel data, wherein, in an odd frame, common lines of the passive display panel are sequentially driven by first preset voltage, the fifth preset voltage is provided to the common lines, which are not be driven, to serve as common voltage, wherein the fourth preset voltage or the sixth preset voltage line is provided to the corresponding segment line of the passive display panel according to the pixel data.

13. The method according to claim 10, when the specific common line is driven by the sixth preset voltage, after a predetermined period, the touch detection is performed on the specific common line, wherein the predetermined period is shorter than the time when the specific common line is driven by the sixth preset voltage.

14. The method according to claim 8, wherein the reset period is longer than or equal to the detection period.

15. An electronic device, comprising:

a passive display panel; and a touch display control circuit, comprising:

a display driving circuit, wherein the display driving circuit comprises:

a reference voltage generation circuit, for generating a plurality of preset control voltages;

a scan line driving circuit, for sequentially driving common lines of the passive display panel by at least one of preset control voltages;

a segment driving circuit, for driving segment lines of the passive display panel by the preset control voltages according to corresponding pixel data; and a touch detection circuit, coupled to at least a common line of the passive display panel, wherein, a specific period for driving a specific common line is divided into a reset period and a detection period, wherein the specific common line is electrically connected to one of preset control voltages by the scan line driving circuit in the reset period, where the touch detection circuit is reset, wherein the specific common line is electrically connected to the touch detection circuit in order to perform touch detection in the detection period.

16. The electronic device according to claim 15, wherein the reference voltage generation circuit is for generating at least a first preset voltage, a second preset voltage, a third preset voltage and a sixth preset voltage.

17. The electronic device according to claim 16, wherein the scan line driving circuit comprises:

a common electrode signal selection sub-circuit, coupled to the reference voltage generation circuit, wherein the common electrode signal selection sub-circuit transmits the sixth preset voltage to the specific common line when the specific common line is driven, and the common electrode signal selection sub-circuit transmits the second preset voltage to the specific common line when the specific common line is not driven.

18. The electronic device according to claim 16, wherein the specific common line is driven by the sixth preset voltage, after a predetermined period, a touch detection is performed on the common line, wherein the predetermined period is shorter than the period when the specific common line is driven by the sixth preset voltage.

19. The electronic device according to claim 16, wherein the reference voltage generation circuit is for generating at least a fourth preset voltage and a fifth preset voltage, wherein, in an odd frame, the scan line driving circuit is for sequentially driving common lines of the passive display panel by sixth preset voltage, the second preset voltage is provided to the common lines, which are not be driven, to serve as common voltage, wherein segment line driving circuit is for providing a first preset voltage or a third preset voltage to the corresponding segment line of the passive display panel according to the pixel data, wherein, in an even frame, the scan line driving circuit is for sequentially driving common lines of the passive display panel by first preset voltage, the fifth preset voltage is provided to the common lines, which are not be driven, to serve as common voltage, wherein segment line driving circuit is for providing a fourth preset voltage or a sixth preset voltage to the corresponding segment line of the passive display panel according to the pixel data.

20. The electronic device according to claim 16, wherein the reference voltage generation circuit is for generating at least a fourth preset voltage and a fifth preset voltage, wherein, in an even frame, the scan line driving circuit is for sequentially driving common lines of the passive display panel by sixth preset voltage, the second preset voltage is provided to the common lines, which are not be driven, to serve as common voltage, wherein segment line driving circuit is for providing a first preset voltage or a third preset voltage to the corresponding segment line of the passive display panel according to the pixel data, wherein, in an odd frame, the scan line driving circuit is for sequentially driving common lines of the passive display panel by first preset voltage, the fifth preset voltage is provided to the common lines, which are not be driven, to serve as common voltage, wherein segment line driving circuit is for providing a fourth preset voltage or a sixth preset voltage to the corresponding segment line of the passive display panel according to the pixel data.

21. The electronic device according to claim 15, wherein the touch detection circuit comprises:

a first capacitor, comprising a first terminal and a second terminal, wherein the second terminal of the first capacitor is coupled to a common voltage;

a switch circuit, coupled between common lines of the passive display panel and the first terminal of the first capacitor;

a first discharging circuit, comprising a first terminal and a second terminal, wherein the first terminal of the first discharging circuit is coupled to the first terminal of the first capacitor, and the second terminal of the first discharging circuit is coupled to the second terminal of the first capacitor;

an operational amplifier, comprising a first input terminal, a second input terminal and an output terminal, wherein the first input terminal of the operational amplifier is coupled to the first terminal of the first capacitor, the second input terminal of the operational amplifier is coupled to a reference voltage;

a second capacitor, comprising a first terminal and a second terminal, wherein the first terminal of the second capacitor is coupled to the first input terminal of the operational amplifier, the second terminal of the second capacitor is coupled to the output terminal of the operational amplifier;

a second discharging circuit, comprising a first terminal and a second terminal, wherein the first terminal of the second discharging circuit is coupled to the first terminal of the second capacitor, and the second terminal of the second discharging circuit is coupled to the second terminal of the second capacitor, wherein, when the specific common line is driven by the sixth preset voltage, after a predetermined period, the touch detection is performed on the specific common line, wherein the predetermined period is shorter than the time when the specific common line is driven by the sixth preset voltage, wherein, when the touch detection is performed on the specific common line, the first discharging circuit and the second discharging circuit are conducted, and then the first discharging circuit and the second discharging circuit are cut off, such that it is determine whether the specific common line is touched or not.

* * * * *